(12) United States Patent
Martinez et al.

(10) Patent No.: US 8,312,807 B2
(45) Date of Patent: Nov. 20, 2012

(54) COOKING APPARATUS

(76) Inventors: Emilio M. Martinez, Littleton, CO (US); Edit M. Martinez, Littleton, CO (US)

( * ) Notice: Subject to any disclaimer, the term of this patent is extended or adjusted under 35 U.S.C. 154(b) by 217 days.

(21) Appl. No.: 11/970,432

(22) Filed: Jan. 7, 2008

(65) Prior Publication Data

US 2009/0173238 A1 Jul. 9, 2009

(51) Int. Cl.
*A47J 37/07* (2006.01)
(52) U.S. Cl. ............... 99/339; 99/340; 99/352; 99/395
(58) Field of Classification Search ............ 99/448, 99/449, 450, 339, 340, 395, 396, 421 V, 403, 99/481, 482, 644, 421 HV; 126/9 R, 9 B, 126/25 A, 30, 25 AA, 50, 25 R, 41 R, 39 R, 126/41 D, 41 E, 25 B; 248/156, 125.7
See application file for complete search history.

(56) References Cited

U.S. PATENT DOCUMENTS

| | | | | |
|---|---|---|---|---|
| 670,144 | A | * 3/1901 | Bond | 248/125.3 |
| 943,569 | A | * 12/1909 | Scamardi | 126/38 |
| 3,759,164 | A | 9/1973 | Robinson | |
| 4,062,341 | A | 12/1977 | Panzarella | |
| 4,502,460 | A | 3/1985 | Kelz | |
| 4,741,322 | A | 5/1988 | Lin | |
| D302,096 | S | 7/1989 | Anderson | |
| 4,909,235 | A | 3/1990 | Boetcker | |
| 4,957,039 | A | * 9/1990 | Reyes | 99/340 |
| 5,038,749 | A | 8/1991 | Jerry et al. | |
| 5,065,735 | A | 11/1991 | Bourgeois et al. | |
| 5,094,223 | A | 3/1992 | Gonzalez | |
| 5,158,067 | A | 10/1992 | Dutro, et al. | |
| 5,222,475 | A | 6/1993 | Greener | |
| 5,315,983 | A | 5/1994 | Law | |
| D369,513 | S | * 5/1996 | Hirt et al. | D7/403 |
| 5,558,008 | A | 9/1996 | Jenkins | |
| 5,572,983 | A | * 11/1996 | Schlosser et al. | 126/25 R |
| 6,000,389 | A | * 12/1999 | Alpert | 126/25 R |
| 6,314,955 | B1 | 11/2001 | Boetcker | |
| D456,664 | S | * 5/2002 | Chou | D7/334 |
| D463,215 | S | 9/2002 | Huang et al. | |
| 6,488,022 | B2 | 12/2002 | Shingler | |
| 6,598,598 | B1 | 7/2003 | Bratsikas | |
| 6,711,993 | B2 | 3/2004 | Robertson | |
| 6,725,856 | B1 | 4/2004 | Barbour et al. | |
| 6,945,243 | B1 | 9/2005 | Walker et al. | |
| 6,978,777 | B2 | 12/2005 | Pestrue et al. | |
| D544,752 | S | 6/2007 | King | |
| 2004/0200359 | A1 | 10/2004 | Snider | |
| 2005/0109330 | A1 | 5/2005 | Pestrue et al. | |
| 2006/0191527 | A1 | 8/2006 | Steadman | |
| 2007/0199555 | A1 | 8/2007 | Gregory | |

* cited by examiner

*Primary Examiner* — Henry Yuen
*Assistant Examiner* — Jianying Atkisson

(57) ABSTRACT

A cooking apparatus comprising a top end having a generally concave cooking surface adapted to also act as a base stand; and a bottom end comprising a plurality of posts adapted to also act as a food preparation device holder upon vertically rotating the apparatus.

9 Claims, 10 Drawing Sheets

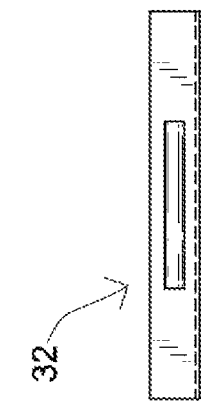
Fig. 5A
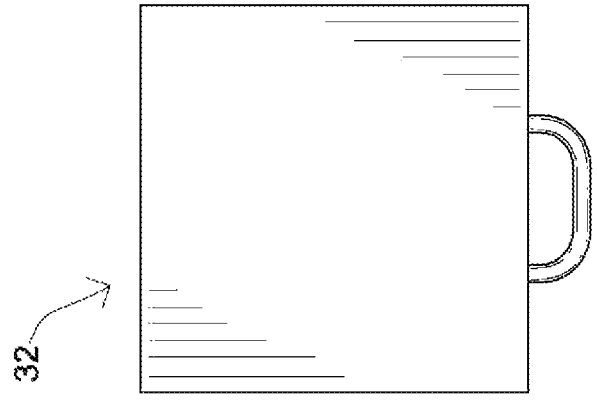
Fig. 5B
Fig. 5D
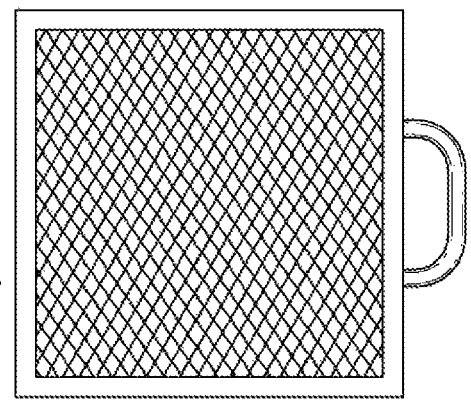
Fig. 5C

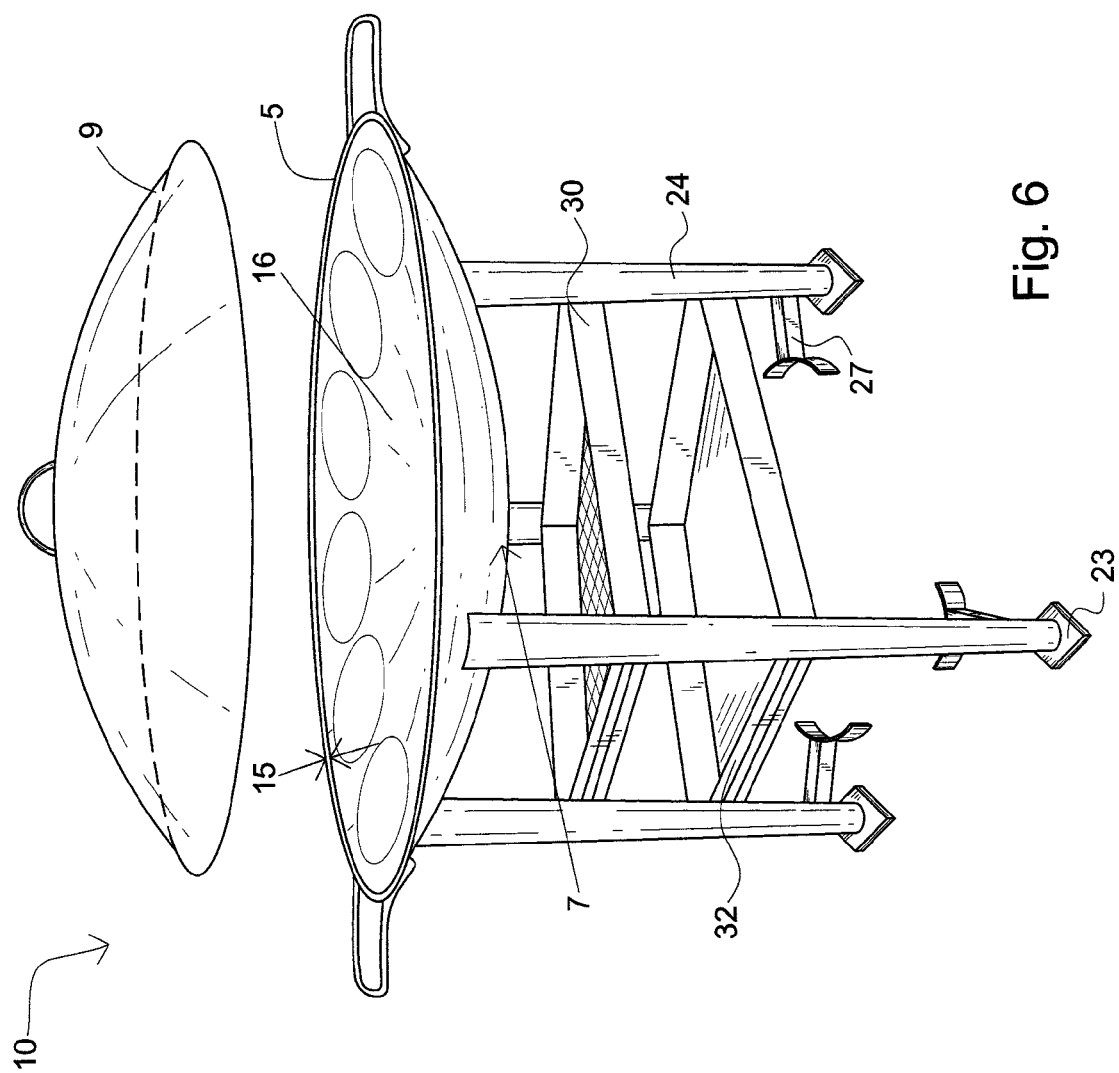

COOKING APPARATUS

FIELD OF THE INVENTION

This invention generally relates to cooking apparatus.

BACKGROUND

Camping, picnicking, and backyard cooking are a pastimes enjoyed by many individuals. It often accompanies a separate goal, such as hunting, a backpacking expedition, or having friends over for lunch or dinner. Either when accompanying a separate goal or otherwise, camping, picnicking and backyard cookouts are often very encompassing activities, requiring a great deal of planning to ensure that required amenities will be provided for and to ensure that everyone involved enjoys the experience as much as possible.

There are many different types of camping. For example, one type of camping involves hiking deep into a wilderness area to set up a campsite, which may be known as a base area, and performing activities over a course of days from that base area. This type of camping often involves carrying or "packing" in the supplies necessary to adequately provide food and shelter over the camping period. For example, a tent, sleeping bag, and portable stove may be used to provide these items.

Alternatively, camping or picnicing may involve what's affectionately termed as "car camping". Car camping involves setting up a campsite within a short distance from one's vehicle. Given the relative easy access to a vehicle, a car camping campsite will typically possess a greater amount of amenities than a backpacker's base camp. For example, one item a car camping campsite may have is a generator. Base camps may have an amount of amenities similar to the number of amenities a car camping base camp possesses. However, these base camps are typically supplied through the use of all-terrain vehicles or animals, as generators and other similar supplies may often be required to be transported over a number of miles. Similarly, backyard cookouts require fuels sources such as propane or other fuel sources in order to cook.

One other item that may be used during car camping, picnicking, or backyard cooking is a grill. Sometimes, large propane-powered grills are employed to cook food, while at other times small hibachi charcoal-fired grills may be used. Non gas-powered grills are often preferred for the flavor they impart on the food prepared on them. Either way, prior art grills are limited in the types of food that can be prepared on them. With prior art grills, a host of cooking attachments may be needed to properly cook different types of food. This can lead to extra packing for the camping trip of items that will only be used once or twice. Many of these problems also occur during barbeques held in a person's backyard, at the park, or in another location.

SUMMARY OF THE DRAWINGS

FIGS. 5A and 5C are the front and top views, respectively, of a cooking apparatus second tray according to one embodiment of the invention.

FIGS. 5B and 5D are the front and top views, respectively, of a cooking apparatus first tray according to one embodiment of the invention.

FIG. 6 is an isometric view of one cooking apparatus with a wok-side up and having tortillas warming on the edge of the wok with meat cooking in the center of the wok according to one embodiment of the invention.

DETAILED DESCRIPTION

Figure 1:
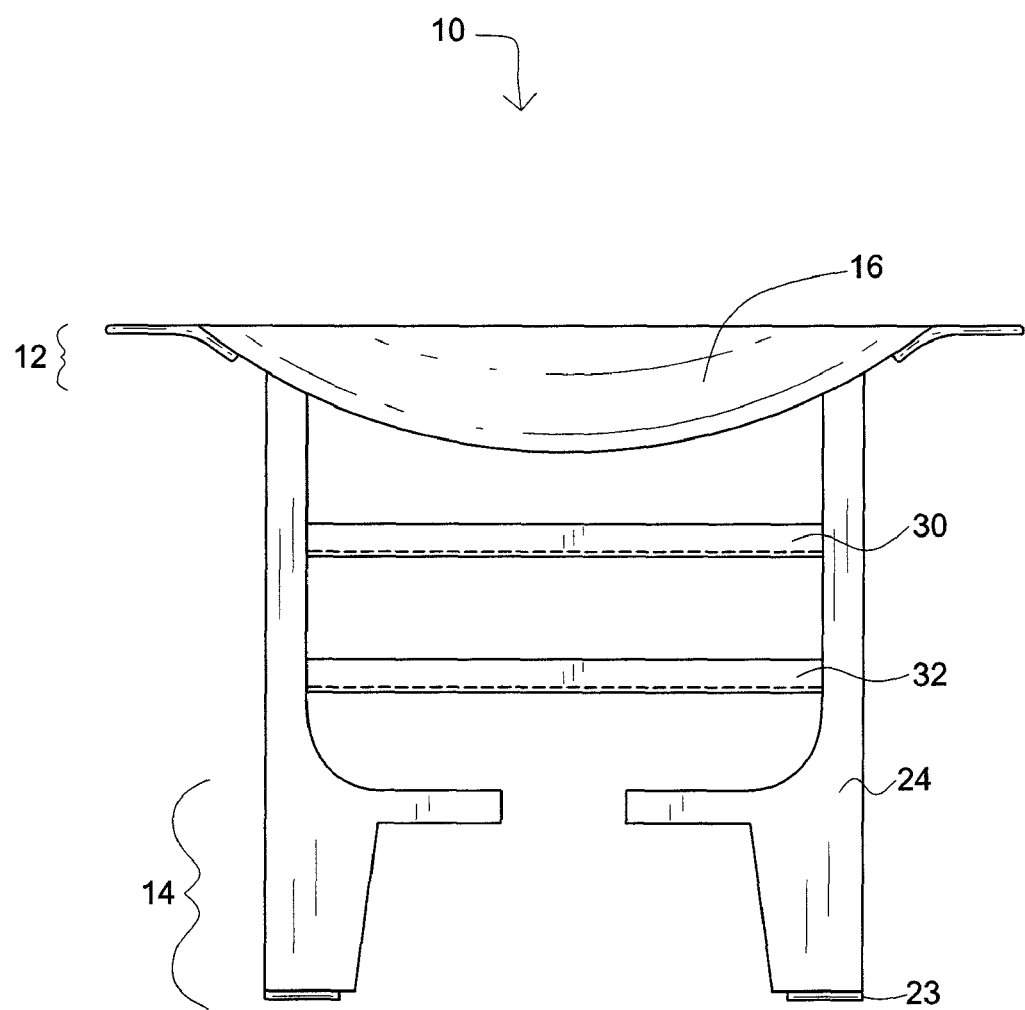
FIG. 1 is a front view of a cooking apparatus having a wok side-up according to one embodiment of the invention.

In order to provide the best camping, picnicking, or backyard cookout experience possible, a new type of camping stove has been created. One embodiment of the stove may be referred to as the Flip-It Fun Cooker™. Embodiments of this stove may also improve the ability of back-yard barbeque enthusiasts to increase their ability to quickly provide well-prepared meals of differing origins. Embodiments also provide a user with the ability to conveniently cook may different types of food—and decreases the number of items that are needed to prepare the dishes. The stove may also be referred to as a cooking apparatus or as a cooking system or a system. One stove embodiment is adapted to hold various types of pots or other cooking devices. The stove also places these devices in the correct location from the heat source to enable the item to best achieve the appropriate temperature at the appropriate moment in time to correctly cook the food. Furthermore, the stove may be vertically rotated, or "flipped", so that a portion of the stove which acts as the base stand for the stove when pots are being used to cook may then be used as a cooking surface similar to a wok.

Embodiments of a cooking apparatus which may be flipped provides a user with different cooking features in a single device where multiple devices were required to provide the same features in the prior art. For example, instead of using a flippable stove to provide the same features, a user may be required to either build a fire with charcoal or wood, or use a charcoal or gas grill. Furthermore, the user would be required to use a stand of some sort to position the pots at the correct distance away from the heat source. A user would be further required to obtain a wok and position that wok away from the heat source at the correct distance. Therefore, at a minimum, at least three prior art articles would be required to perform the same functions that an embodiment of a flippable cooker is able to perform. Furthermore, a greater amount of time is required to set up and tear down the entire prior art features than is required to perform the same functions with the flippable cooker, which may also be referred to as a stove.

In order to flip one embodiment of a stove, a user may remove trays that are coupled to the stove. In one embodiment, the stove is comprised of a top end and a bottom end. The top end may be comprised of a concave cooking surface such as, but not limited to, the wok-like cooking surface. The bottom end may be comprised of a stand adapted to receive pots or other cooking receptacles of various shapes and sizes. Each end may also serve as the base for each opposing end, when the opposing end is in use. In addition, there may be a plurality of posts which couple the top end to the bottom end. Between the two ends, and also coupled to the posts may be the trays. The trays may be used to allow various types of fuel sources to be appropriately placed below the cooking surface. The trays may be slidable trays. Additional features such as, but not limited to, a carrying case and a lid for the wok are also contemplated.

Termonology:

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "couple", "coupled", "coupling", or any variation thereof, as used in this specification and the appended claims refers to either an indirect or direct connection between the identified elements, components or objects. Often the manner of the coupling will be related specifically to the manner in which the two coupled elements interact. Specifically, this term may be used to define two elements joined by a bolted fastener, a latch, a hook, rails, or any other reasonably readily removable fastening device.

The term "integrate" or "integrated" as used in this specification and the appended claims refers to a blending, uniting, or incorporation of the identified elements, components or objects into a unified whole.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

One Embodiment of a Cooking Apparatus:

As best shown in FIGS. 1 and 5A through 8, one embodiment of a cooking apparatus 10 may be comprised of a top end 12. The top end may have a generally 3 inch deep concave cooking surface, as best shown in FIG. 6. The concave cooking surface may also be referred to as a wok 16. One wok may be about three inches deep and about 22 inches in diameter, but in other variations the dimensions may vary. One cooking apparatus may also be comprised of a lid 9. Furthermore, the concave cooking surface may not be a wok in some embodiments. For example, in one embodiment, the concave cooking surface may be comprised of a cultivating disk, also known as a disk harrow. One concave cooking surface may have a thickness 15 which is greater in the center 7 and lesser at the edges 5, while other wok embodiments may have uniform thicknesses. The edge may also be referred to as the rim.

Figure 7:
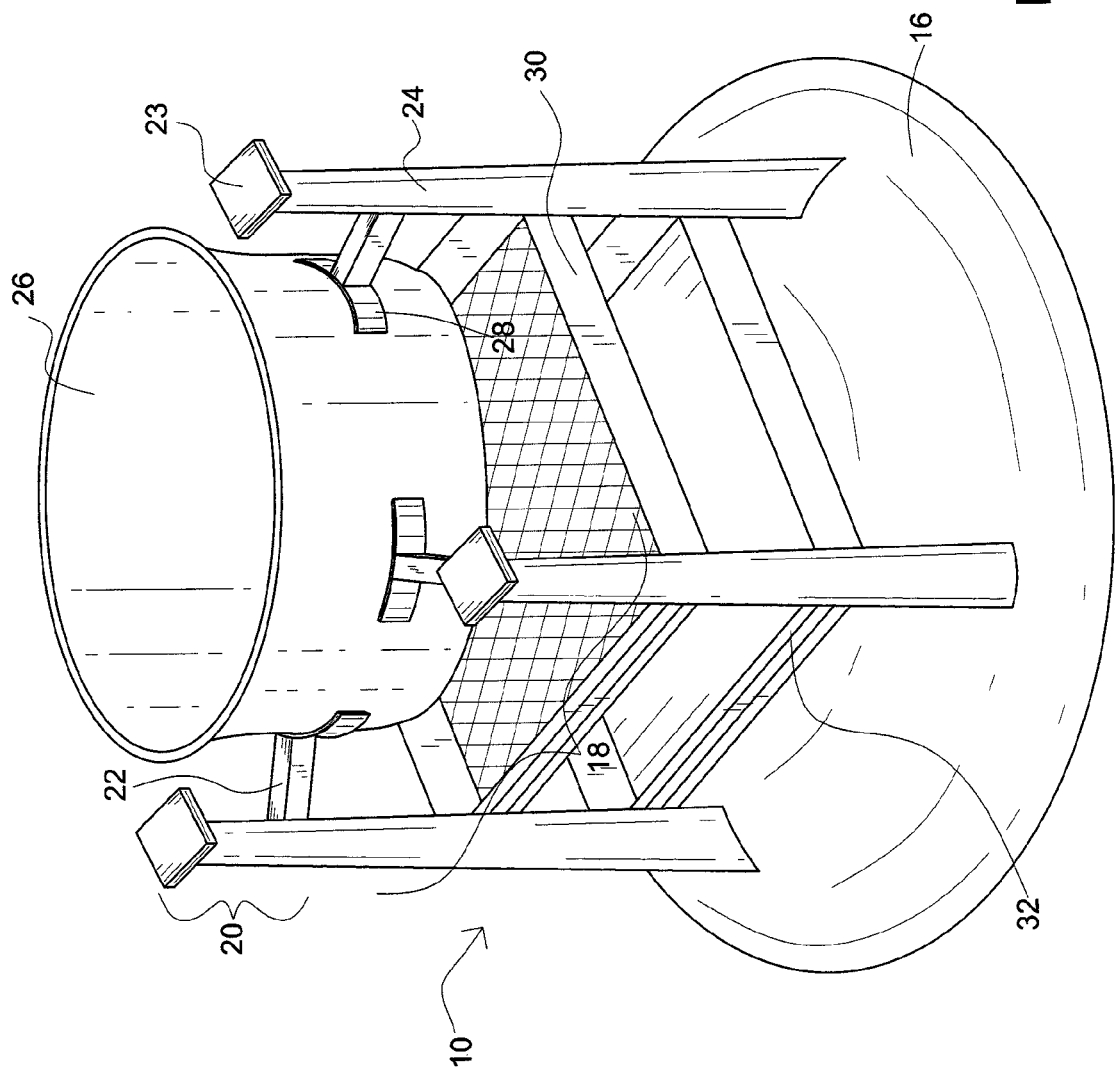
FIG. 7 is an isometric view of one cooking apparatus with a pot-holder side up and a pot in the pot holder according to one embodiment of the invention.
Figure 9:
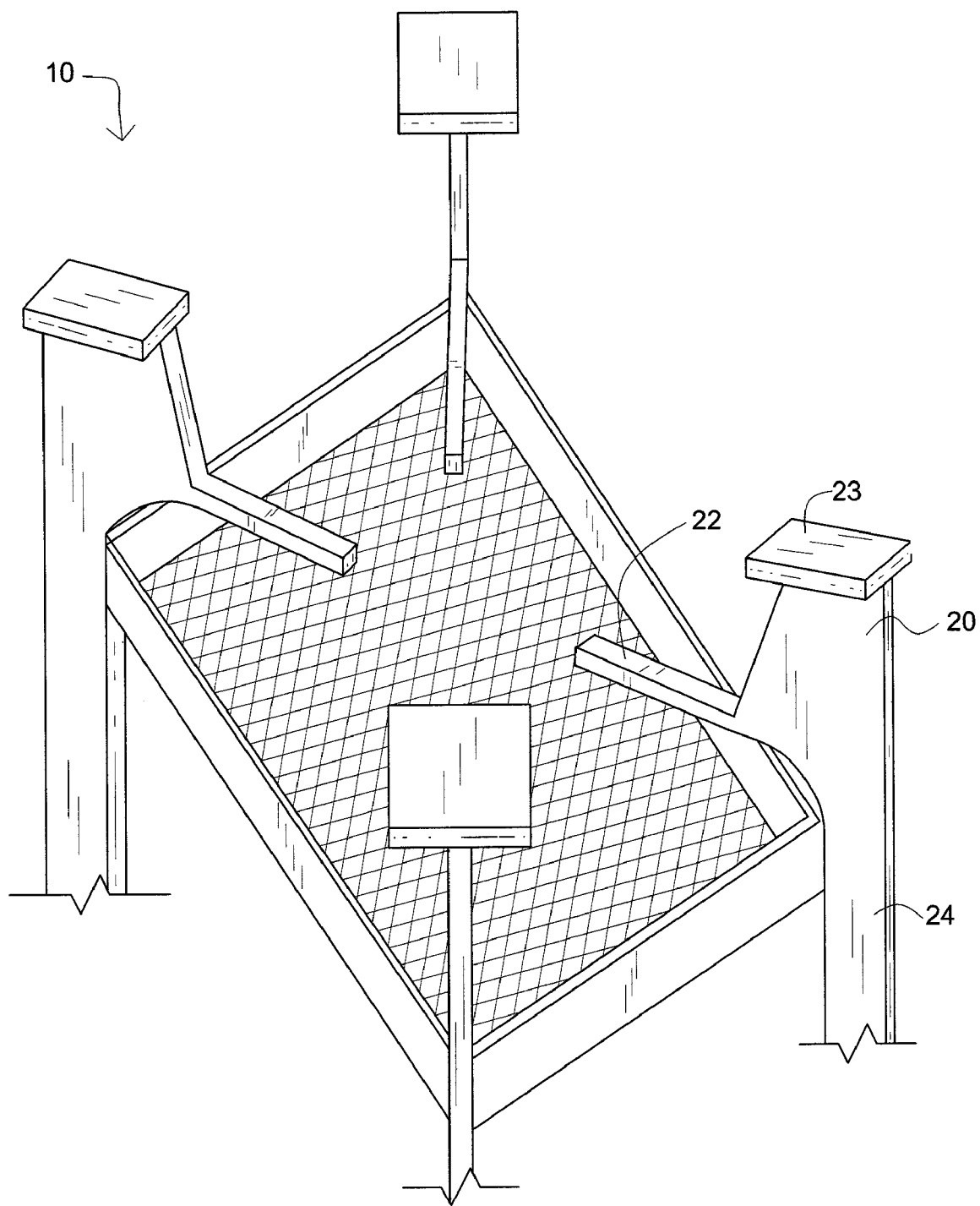
FIG. 9 is an isometric view of a food preparation device holder created by a plasma arc cutter according to one embodiment of the invention.

In addition to the top end 12, a cooking apparatus 10 may also be comprised of a bottom end 14. The bottom end of one cooking apparatus 10 may be coupled to the top end through a plurality of posts 24. The bottom end may be comprised of a food preparation device holder 18, as best shown in FIGS. 7 and 9. The food preparation device holder may also be referred to as a cooking pot holder or a reception area since the holder is adapted to receive pots and other food preparation devices. For example, stock pots, goulash pots, and Dutch ovens may be received by the holder. At least three versions of the preparation device holder are contemplated. In one version, as best shown in FIG. 9, the reception area is comprised of a plurality of post ends 20 and platforms 22.

One embodiment may be comprised of four posts 24. In one device holder version, each post may be coupled or integrated to a platform 22 at a platform outer corner. The post ends 20 may also be comprised of resting pads 23. Each pad may also be referred to as an apparatus resting end or a post stand resting end as it may be adapted to stabilize the cooking apparatus when flipped. The pad may not be an actual "pad" at all—having minimal resilient qualities that pads typically possess, but may be comprised of a non-resilient material such as, but not limited to, a metal.

Figure 8:
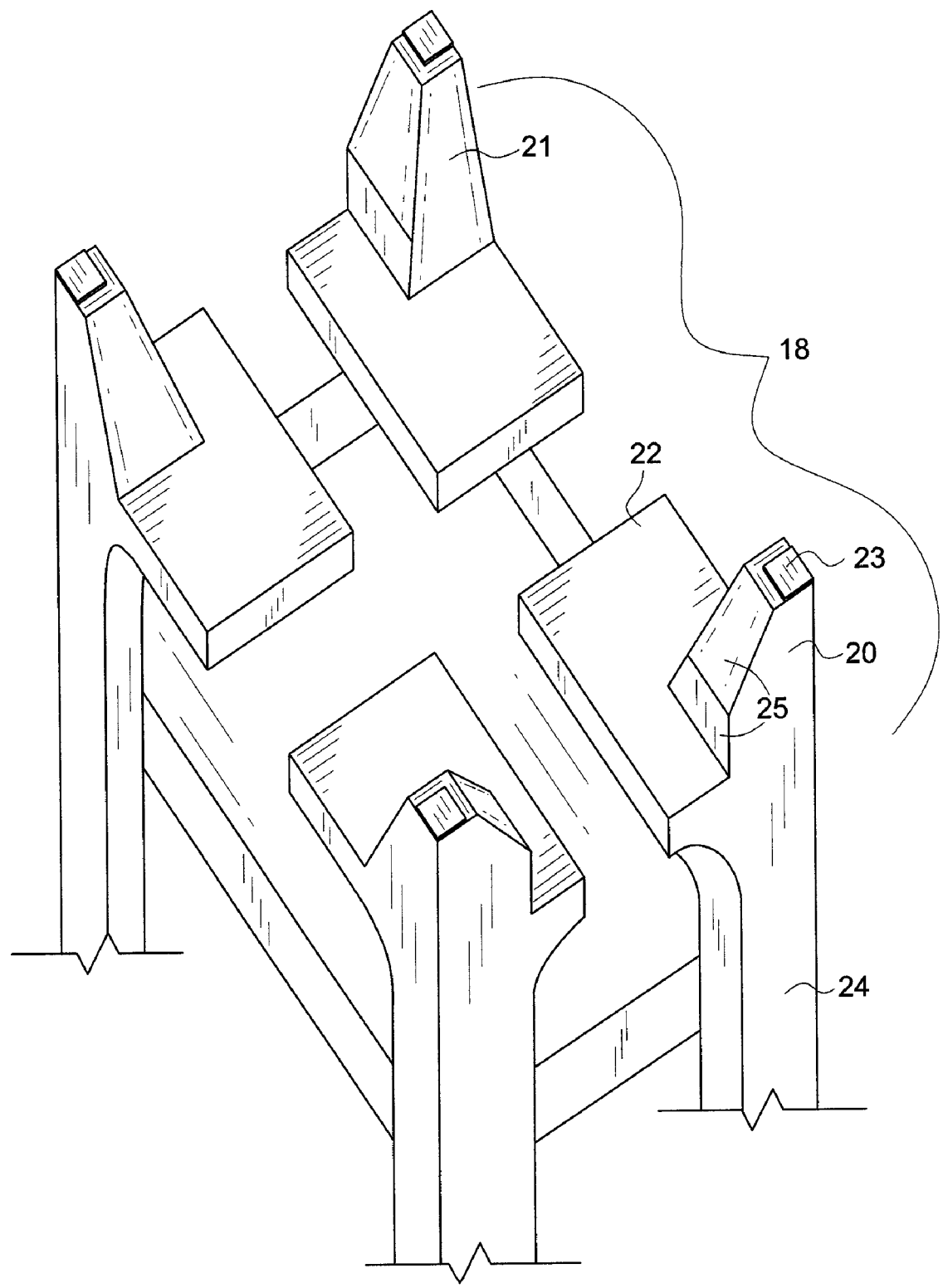
FIG. 8 is an isometric view of a food preparation device holder according to one embodiment of the invention.
Figure 10:
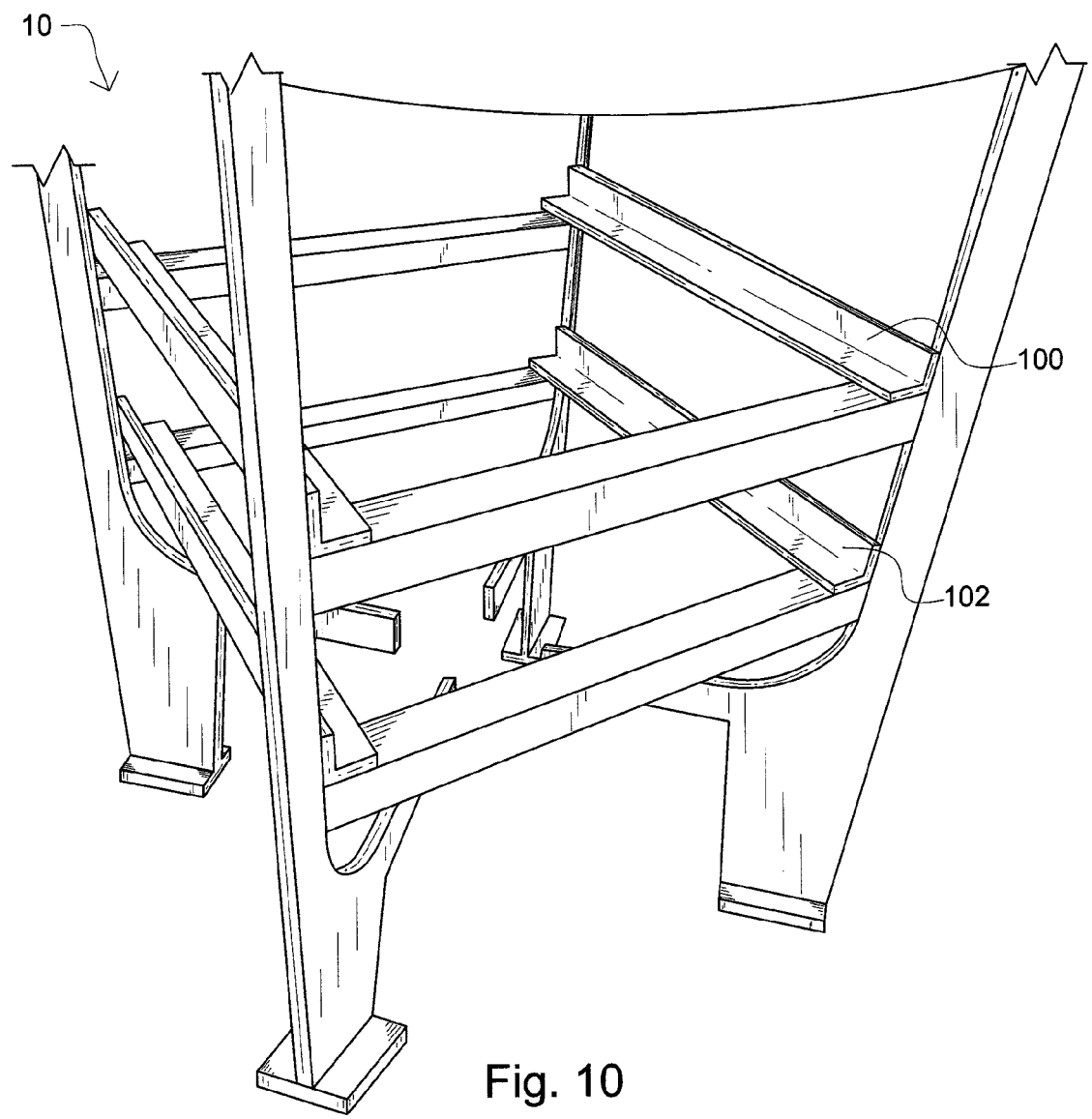
FIG. 10 is an isometric view of a cooking apparatus with the wok side up and showing a first and second rail system with no trays inserted into the rails according to one embodiment of the invention.

An embodiment may also have a post end 20 which is comprised of slanted face 21. Or the post end may have a dual-angled face 25. As best shown in FIG. 8, post ends may be comprised of both slanted and dual-angled faces. In one embodiment, a platform 22 may be adapted to receive a cooking device such as, but not limited to, a pot. Furthermore, the post ends 20 may be adapted to keep the pot from falling off of the platform. As best shown in FIG. 10, the post ends 20, platforms 22, and posts 24, may be thinner than the embodiment shown in FIG. 8. In one embodiment, the thickness of the posts, post ends, and platforms may be about ¼ inches thick.

A second version of a food preparation device holder 18 is best shown in FIG. 7. This version of a device holder may also be comprised of four posts 24. Embodiments and version may have more or less posts as well. Furthermore, the posts may also have resting pads 23. In both versions, the resting pads may help stabilize the stove when the wok 16 is being used, as best shown in FIGS. 1 and 6. The second version may also be comprised of arms 27. As the posts are generally cylindrical and therefore are comprised of a longitudinal axis, the arms 27 may extend generally inwardly and generally perpendicularly from the axis, as best shown in FIG. 7. These posts, and other items in the cooker, may be cut to shape through the use of a plasma arc welding device as best shown in FIG. 9. Other welding devices may also be used. Non perpendicularly aligned arms are also contemplated in order to stabilize a pot at a desired distance above the heat source. At one end of the arms is an arcuate extension 28—the arcuate extensions also being referred to as arcuate arm ends in some embodiments. The extensions are adapted to receive an outer surface of the pot 26, stabilizing the pot during meal preparation. One extension version may have a frictional inner surface adapted to keep the pot at a desired distance above a heat source.

Figure 2:
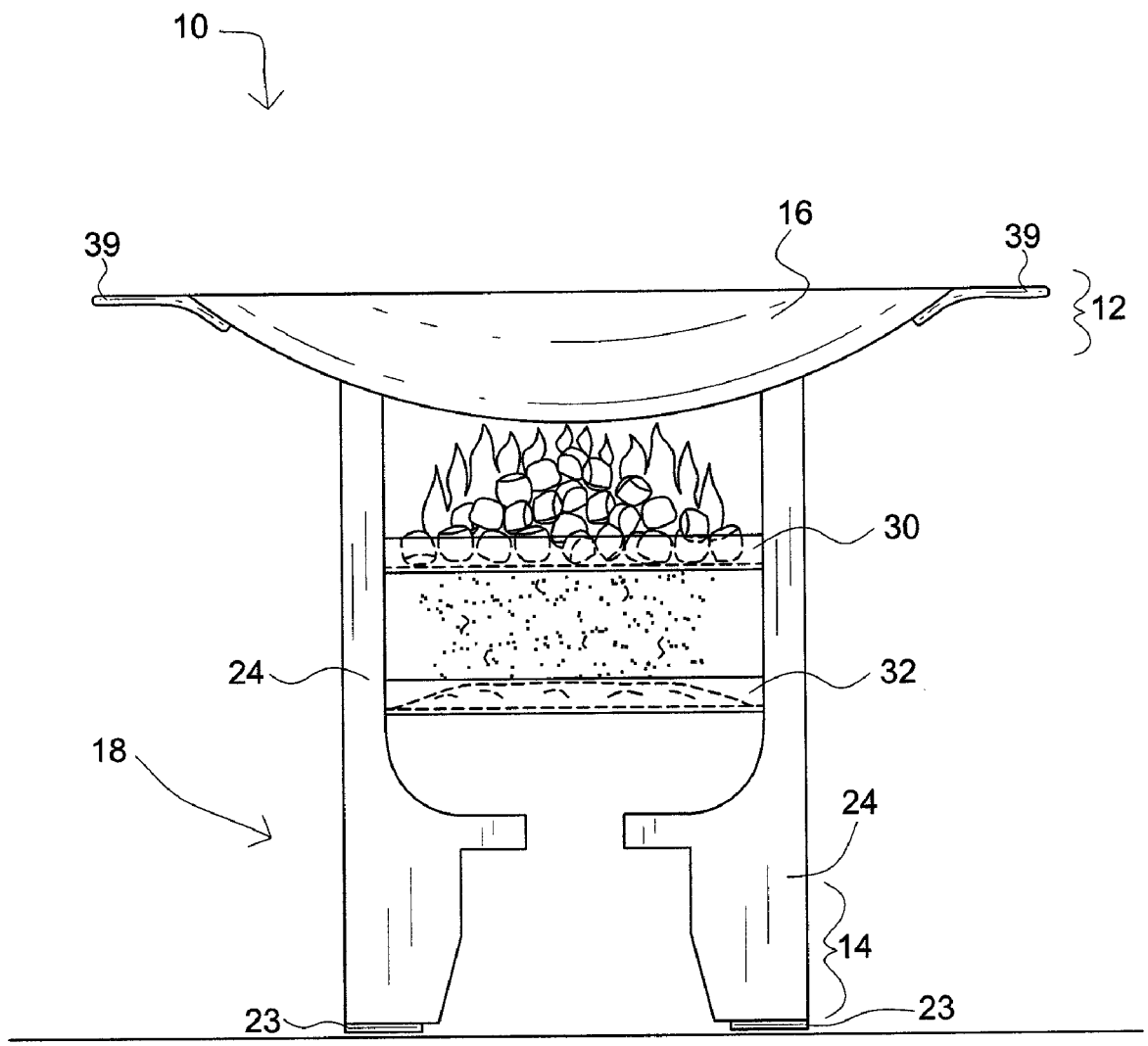
FIG. 2 is a side view of a cooking apparatus having a wok side up, burning charcoal briquettes on a first tray, and ashes falling onto a second tray according to one embodiment of the invention.

In addition to the above listed and described items, one embodiment of a cooking apparatus 10 may be comprised of a first tray 30. The first tray in one embodiment is placed below the cooking surface, such as below the wok 16. The first tray may be used as the placement location for the fuel. As best shown in FIG. 5B, the first tray may be comprised of a grated bottom side. The bottom may be grated in order to allow ash to fall from tray to a collection location below the tray as best shown in FIG. 2. Ash may be generated in one embodiment if charcoal briquettes are used as a fuel source.

The first tray 30 may be removably coupled to the system. In one embodiment, the tray may be horizontally slidably removed from the stove. Such a slidable tray may couple to rails on the stove enabling the tray to slide. The rails in one embodiment may be coupled to the posts. Other removing techniques are also contemplated such as, but not limited to, a tray that may generally vertically slide into position or a tray that may snappably or otherwise lock into position. For example, one embodiment may be a sectionalized embodiment. A sectionalized embodiment may be comprised of different sections (such as, but not limited to, a top section and a bottom section) which may snap, fasten, or otherwise lock together through locking pins or otherwise. A sectionalized embodiment may allow a user to more easily travel with the system as it may allow the system to take up less space when the sections are not coupled together. Furthermore, the tray may be a section which snaps into place.

Figure 3:
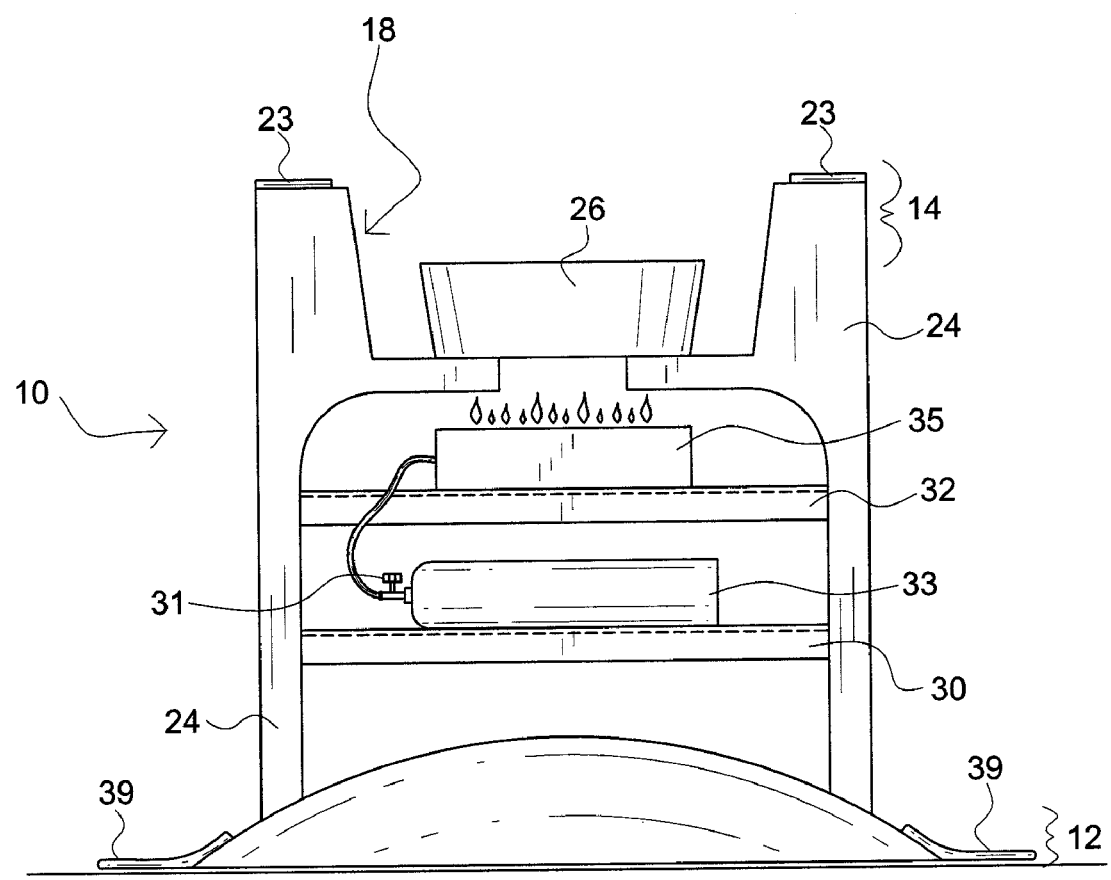
FIG. 3 is front view of a cooking apparatus having a pot-holder side up, a pot in the pot holder, a lit burner, and a tank operatively coupled to the burner according to one embodiment of the invention.

An embodiment may also be comprised of a second tray 32. Instead of a grated bottom side similar to the first tray, the second tray may be comprised of a generally smooth bottom side. The second tray may be adapted to catch the falling ashes from the first tray, as best shown in FIG. 2, or the second tray may enable a burner or other fuel supply system to rest on the tray, as best shown in FIG. 3. One burner may be used to heat up charcoal briquettes or other fuel to decrease the amount of lighter fuel needed. As shown in FIGS. 6 and 7, at least one version of the stove is adapted to vertically rotate, or flip, in order to provide a user with multiple cooking options. When the system is rotated to a position where the wok is being used, as best shown in FIG. 6, the first tray may be placed below the wok 16 in order for the ashes to fall through to the second tray. The ashes land on the second tray as the two trays may be vertically aligned. The trays may also be aligned with the wok holder. Some embodiments may only have one try or may not have a tray.

As best shown in FIG. 7, the generally concave cooking surface, which may be a wok 16, may also be adapted for further use as a base stand. The base stand may stabilize the stove when the food preparation device holder is in use. Furthermore, one embodiment of a wok base stand may couple or integrate to the rest of the system through three or more posts.

One embodiment may be comprised of a metallic look. For example, one stove may have a brushed steel finish, or may simply have a wrought-iron finish. The stove may be comprised of steel, iron, or any alloy or any other metal. Alternatively, a finish may be in sports-teams colors. Furthermore, alternative embodiments may be comprised of a carrying case or multiple carrying cases for the stove. The carrying case may be used in a sectionalized embodiment wherein, the system is dismantled and placed within either a hard-shelled or soft-shelled case adapted to enable a user to more easily transport the system. Also, a system may have a coffee pot adaptation wherein, a coffee pot may be place on the system to keep brewed coffee warm. The coffee pot adaptation may also enable to brew coffee directly on the stove.

Figure 4:
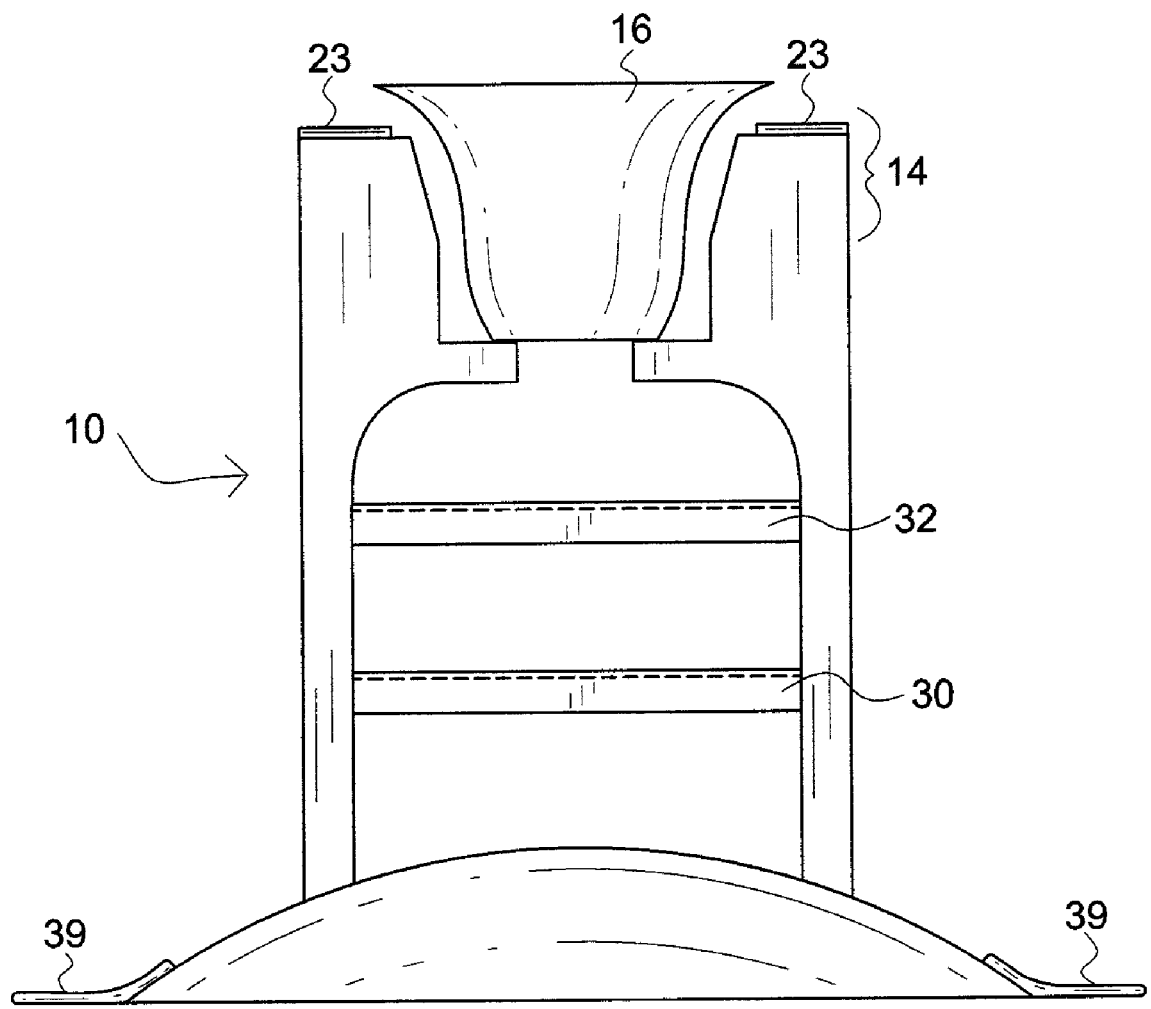
FIG. 4 is a side view of a cooking apparatus having a pot-holder side up and a goulash pot in the pot holder according to one embodiment of the invention.

One stove may be manufactured using a plasma arc welder as best shown in FIGS. 4 and 9. Furthermore, a pot resting in the pot holder may have a pot bottom wherein the holder is adapted to position a pot bottom at a specified distance above the heat source.

One Method of a Using of a Cooking Apparatus:

As best shown in FIGS. 2 through 4, one method of cooking is comprised of using a cooking apparatus 10 having a bottom end 14 and a first tray 30. One method is comprised of placing the cooking apparatus bottom end on a generally flat surface as best shown in FIG. 2. This may also be referred to as a first position. In one cooking method, using a cooking apparatus in an outdoor camping environment, resting pads 23 may be placed on the ground. In doing so, a top end 12 having concave cooking surface generally faces upwards and allows food to be placed onto the surface.

When the cooking apparatus 10 is substantially stable, in one method, fuel is placed onto the first tray 30. In one method, and as best shown in FIG. 2, charcoal briquettes may be placed on the first tray and ignited. Alternatively, wood chips or another fuel supply such as a low pressure propane burner may be used instead of charcoal briquettes. In one method, the cooking apparatus may have the first tray and may also have a second tray 32. The first tray may be the tray in a vertically higher position than the second tray.

In other methods, the cooking apparatus may be flipped so that the bottom end 14 is facing upward. In such methods, the fuel may be placed on the first tray, although the first tray may be in the vertically lowest position, as best shown in FIG. 3. This may also be referred to as a second position. However, in a still further other method, the first tray may in the vertically highest position even when the apparatus is flipped and the bottom end is facing upward.

Upon setting fuel in the correct position and placing food on the cooking surface, the fuel may be ignited and burned. Food may also be placed in a pot 26 in some methods. Igniting and allowing the fuel to burn heats the cooking surface and heats the food located therein. Upon cooking the food for the desired length of time, the food is removed and eaten.

One version of a first tray 30 may have a grated bottom surface, as best shown in FIG. 5C. The grated bottom may allow ash to fall through the grated surface to the second tray 32. For example, as best shown in FIG. 2, as the charcoal briquettes are burned and turned to ash the ash may filter to the second tray. Alternatively, the first tray may be used as a resting location for a fuel tank 33, as best shown in FIG. 3. One type of fuel tank may be a 20 lb propane tank which may set to the side of the apparatus 10. Low pressure propane burners may be used in an embodiment. The fuel tank may have a supply nozzle 31 coupled to one end of a supply hose through a pressure regulator, the supply hose opposing end coupled to a burner 35. The burner may be adapted to removably couple to a tray. For example, a bolt may be adapted to screw into a bore on a tray and into a hold onto a burner underside. Other coupling mechanisms are contemplated. In one method, in heating the food, tortillas are warmed near the edge of the concave cooking surface while meat and vegetables are cooked in the center where heat is the highest, as best shown in FIG. 6.

As best shown in FIGS. 2 and 3, a method may be comprised of setting either the top end 12 or the bottom end 14 on a generally flat surface. This may include placing resting pads 23 on the surface. One flat surface may be the ground near a campsite or in a backyard table. The resting pads may be coupled or integrated to an end of a post 24. The resting pads may also be referred to as a post stand resting end. Placing the cooking apparatus 10 on a generally flat surface may allow the apparatus to be placed in a generally upright position, allowing either the wok 16 or the food preparation device holder 18 to be easily accessed. In one method, upon placing the bottom end upright, a cooking pot 26 may be placed in the holder 18, as best shown in FIG. 3. One apparatus may be adapted to receive an eight liter or a ten liter goulash pot, a ten inch or a 12 inch Dutch oven, or an eight quart or a twelve quart stock pot. A bottom surface of the cooking pot may then be placed above the burner 35 resting on the second tray 32, which may be directly below the pot after flipping the apparatus. However, in another method the trays may be removed from the apparatus prior to or after flipping the apparatus. Therefore, when the bottom end is facing upwards, the trays may be recoupled to the apparatus so that the burner is resting on the first tray. In either method, upon igniting the fuel from the tank the burner is able to heat and cook the food in the pot or in the wok.

During a single cooking experience, it may be required to use both the wok 16 (or other concave cooking surface) and the food preparation device holder 18. One method of doing so may include first using the wok, as best shown in FIG. 2, then using the handles 39 coupled to the wok 16 to lift the bottom end 14 off the ground and vertically rotate the apparatus 10 so that the food preparation device holder is accessible, as best shown in FIG. 3. In other methods, the food preparation device holder may be used first, and the apparatus flipped to then use the wok. Prior to flipping the apparatus, the first tray 30 and the second tray 32 may be removed from the system. The trays may also have handles, as best shown in FIGS. 5C and 5D. The trays may then be placed back onto the system upon vertically rotating the system. In one method, the system may be rotated about 180 degrees, resting an opposing end on the generally flat surface. In one method, the generally concave cooking surface may be used as a base stand upon rotation and resting upon the rim, providing stability for the system.

A method may further include employing a sectionalized apparatus 10. For example, the wok of one apparatus may snappably or otherwise couple to the posts 24. In such a method, the apparatus may be disassemble into 4 posts, the wok, and two trays for easy storage and transportation, and make the stove lighter. Different coupling mechanisms between the different sections are contemplated, for example, a pin or a pin-spring mechanism may be used or sections which screw to each other may be used. Other coupling mechanisms such as, but not limited to, magnetic coupling mechanisms, are also contemplated. The wok may be referred to as the top section and the posts/trays/holder may be referred to as the bottom section.

In removing the trays, a method may also include slidably removing the first tray from a first rail set 100 and the second tray from a second rail set 102, as best shown in FIG. 10. The rails may be coupled to the posts. The method may further include slidably placing the first tray into the second rail set and the second tray into the first rail set. In yet another method, one may integrate and couple a cultivating disk to the cooking apparatus. The cultivating disk may be the wok or other concave cooking surface in one method. The rails may be adapted to receive the trays in either the first position or the second position.

Alternative Embodiments:

The embodiments of the cooking apparatus and methods of use as illustrated in the accompanying figures and described above are merely exemplary and are not meant to limit the scope of the invention. It is to be appreciated that numerous variations to the invention have been contemplated as would be obvious to one of ordinary skill in the art with the benefit of this disclosure.

We claim:

1. A cooking apparatus featuring two cooking areas comprising:
a first end;
a wok-like unperforated cooking surface, the cooking surface being generally concave and including a rim, the rim positioned at the first end;
three or more support posts, each of the support posts being fastened to the cooking surface, projecting generally away from the wok-like unperforated cooking surface, and comprising a post end;
a second end, the second end positioned opposite to the first end including the three or more post ends;
a food preparation cooking device holder positioned at the second end vertically opposite to the direction of said wok-like unperforated cooking surface at said first end, wherein the holder are platforms or arms integral with or coupled to said three or more support posts for receiving pots, goulash pots and Dutch ovens;
at least a first tray being fastened to and positioned between at least three of the three or more support posts and positioned between the wok-like unperforated cooking surface and the three or more post ends and the food preparation device holder providing a heat source;
wherein the cooking apparatus is adapted to be vertically rotated and flipped upside down from a position for cooking food on said wok-like unperforated cooking surface to a position where the wok-like unperforated cooking surface becomes the base for holding said food preparation cooking device to cook food.

2. The cooking apparatus of claim 1, wherein the first tray further comprises a grate section, the grate section being perforated and adapted to support a stack of charcoal briquettes and allow ash from burned charcoal briquettes to pass through the grate section, and a second tray, the second tray being fastened to and positioned between at least three of the three or more support posts and positioned between the food preparation device holder and the first tray.

3. A method comprising: using a cooking apparatus having,
a first end;
a cooking surface, the cooking surface being generally concave and including a rim, the rim positioned at the first end of said cooking surface;
three or more support posts, each of the support posts being fastened to the cooking surface, projecting generally away from the cooking surface, and comprising a post end;
a second end, the second end positioned opposite to the first end including the three or more post ends;
a food preparation device holder positioned at the second end and supported by said three or more support posts for receiving pots, goulash pots and Dutch ovens to cook food therein, and
at least a first tray being fastened to and positioned between at least three of the three or more support posts and positioned between the cooking surface and the three or more post ends for providing a heat source for cooking,
resting the second end and the cooking apparatus on a generally flat surface;
placing food on the concave cooking surface;
heating the concave cooking surface to cook the food placed thereon;

removing the cooked food from the concave cooking surface;

placing the cooking apparatus in a second position, the second position being where the rim of the concave cooking surface of the first end provides a base on a generally flat surface with the second end above the first end;

placing a food preparation device containing food on the food preparation device holder and heating the food preparation device to cook the food in the food preparation device.

4. The method of claim 3, including a first burning fuel, the first burning fuel residing between the first tray and the concave cooking surface when the cooking apparatus is in the first position; and a second burning fuel, the second burning fuel residing between the second tray and the food preparation device holder when the cooking apparatus is in the second position.

5. The method of claim 4 wherein the first burning fuel and the second burning fuel are selected from a group consisting of wood, charcoal or gas.

6. The method of claim 5, wherein the gas is propane.

7. A cooking apparatus comprising:

a first end;

a wok-like cooking surface, the cooking surface being generally concave and including a rim, the rim positioned at the first end;

three or more support posts, each of the support posts being fastened to the cooking surface, projecting generally away from the cooking surface, and comprising a post end;

a second end, the second end positioned opposite to the first end including the three or more post ends;

a food preparation device holder positioned at the second end vertically opposite to said concave cooking surface at said first end and supported by said three or more support posts for receiving pots, goulash pots and Dutch ovens and at least a first tray being fastened to and positioned between at least three of the three or more support posts and positioned between the cooking surface and the three or more post ends and the food preparation device holder for providing a heat source, the first tray further comprising a grate section, the grate section being perforated and adapted to support a stack of charcoal briquettes and allow ash from burned charcoal briquettes to pass through the grate section, and a second tray, the second tray being fastened to and positioned between at least three of the three or more support posts and positioned between the food preparation device holder and the first tray, the second tray further comprising a grate section, the grate section being perforated and adapted to support a stack of charcoal briquettes and allow ash from burned charcoal briquettes to pass through the grate section.

8. The cooking apparatus of claim 7, wherein the second tray further comprises a pan section for collecting ashes.

9. The cooking apparatus of claim 7, wherein the first tray further comprises a pan section for collecting ashes.

* * * * *